UNITED STATES PATENT OFFICE.

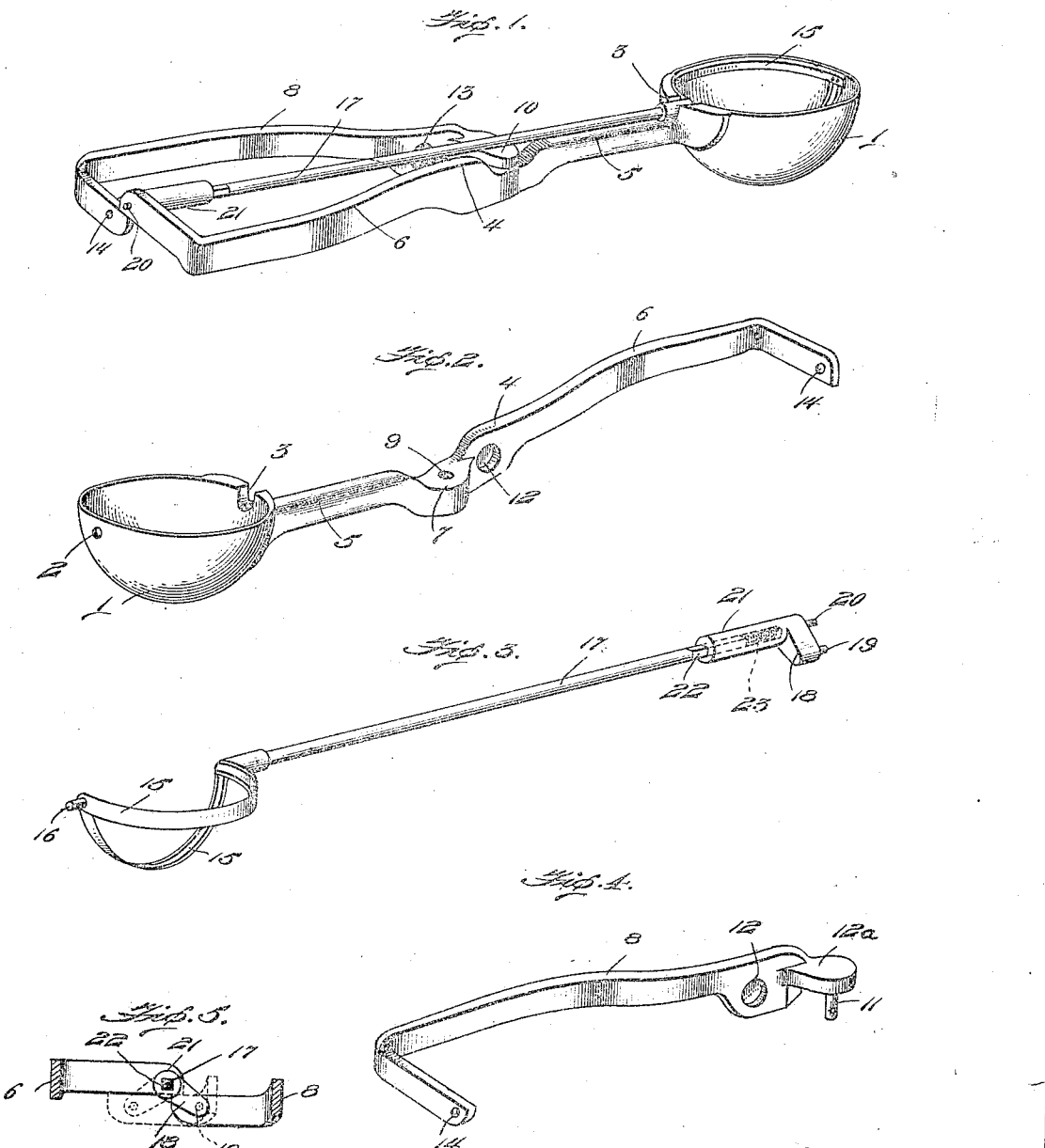

RAYMOND B. GILCHRIST, OF NEWARK, NEW JERSEY, ASSIGNOR TO THE GILCHRIST COMPANY, OF NEWARK, NEW JERSEY, A CORPORATION.

ICE-CREAM DISHER.

1,109,576.

Specification of Letters Patent. Patented Sept. 1, 1914.

Application filed September 26, 1907. Serial No. 394,728.

*To all whom it may concern:*

Be it known that I, RAYMOND B. GILCHRIST, a citizen of the United States, residing at Newark, in the county of Essex and State of New Jersey, have invented certain new and useful Improvements in Ice-Cream Dishers, of which the following is a specification.

The invention relates to ice cream dishers, and more particularly to that type generally known as "automatic" dishers, which are adapted to be held and operated to discharge the cream therefrom by one hand.

One object of the invention is to provide a disher, which is so organized, that its parts may be readily taken apart and assembled and which will be thoroughly sanitary in its construction.

Other objects of the invention will be apparent from the device as hereinafter described.

The invention consists of the several novel features hereinafter set forth, and more particularly defined by claims at the conclusion hereof.

In the drawings: Figure 1 is a perspective of the assembled disher. Fig. 2 is a detail perspective of the bowl and the handle which is rigidly secured thereto. Fig. 3 is a perspective of the scraper, and the shaft upon which it is mounted. Fig. 4 is a detail perspective of the lever which is pivoted to the handle. Fig. 5 is a sectional figure showing by full lines the normal position of the actuator arm, and by dotted lines, the position assumed when the lever has been shifted to operate the scraper.

The disher comprises a frame 4, which has one of its ends rigidly and permanently attached to one side of a hemispherical bowl 1. This frame comprises a shank or approximately straight portion 5 forming in effect a part of the handle and an integral handle-portion 6, which is laterally offset with respect to the shank 5.

A scraper comprising a pair of arcuate blades 15, is adapted to sweep across the inner face of the bowl to sever the ice cream from the bowl. This scraper is secured to a shaft 17, and is rotatable in the bowl. A trunnion 16 on the outer end of the scraper is adapted to fit into a bearing 2 which is formed in one side of the bowl. An open bearing 3 is formed at the opposite side of the bowl, and the shaft 17 passes through said bearing and is removable transversely through said bearing. A lever 8 is provided with a pivot-pin 11 which fits in an opening 9 which extends through a lug 7 on frame 4 and a lug 12ᵃ on lever 8 is adapted to abut against the face of lug 7. The side portion of the lever 8 extends laterally from the pivot 11 so that it will be opposite the laterally offset handle 6 and so that the lever may be operated by pressing the lever 8 and handle 6 together.

The outer end of frame 4 and the outer end of lever 8 are each extended inwardly, and in each of these inwardly extending portions there is formed an opening 14. The opening 14 in frame 4 is adapted to receive and forms a bearing for a stud 20 of sleeve 21. Said sleeve is slidably connected to a square portion 22 on the outer end of shaft 17, by a socket in said sleeve which is correspondingly square, so that rotation of the sleeve will impart rotation to the shaft. The slidable connection between the sleeve 21 and the shaft 17 permits stud 20 to be withdrawn from its bearing in the frame 4 to permit the scraper and shaft to be removed. A spring 23 in the socket formed in sleeve 21 and between the sleeve and the outer end of shaft 17 serves to hold the sleeve in operative relation to the frame.

An actuator arm 18 is formed on sleeve 21 and a stud 19 on said arm fits into the hole 14 in lever 8. As shown in Fig. 5, the inner ends of the inward extensions at the outer ends in frame and lever, respectively, are adapted to abut against each other to limit the pivotal movement of the actuator-arm and lever in one direction, and to limit the outward movement of lever 8. A coil-spring 13 having its terminal seated in sockets 12 in the lever and frame respectively, serves to operate and press the lever 8 outwardly to rotate shaft 17 in one direction and to retract the scraper after it has been operated in the opposite direction by manual force applied to the lever.

In operating the device, assuming it to be assembled, as shown in Fig. 1, the operator, grasping handle portion 6, the frame 4 and lever 8, dips the bowl into the ice cream to fill it and to discharge the cream, presses lever 8 inwardly. This operation of lever 8 will cause it to rotate actuator-arm 18 and shaft 17 to rotate the scraper in the bowl and discharge the ice cream therefrom. Upon release of lever 8 spring 13 will retract the scraper, shaft and actuator arm to the normal position shown in full lines in Fig. 5.

When it is desired to clean the device, sleeve 21 may be moved longitudinally of shaft 17 to withdraw studs 20, 19, from the openings in the frame and lever respectively, and thereupon, shaft 17 may be lifted laterally out of open bearing 3 to remove the scraper from the bowl. Shaft 17 when held in operative position, overlies lug 12$^a$ of lever 8 and thus serves to hold the lever in pivotal relation to the frame. When the shaft and sleeve are in operative position, they rotate together and the sleeve serves as means, which is movable on the shaft, for holding the shaft in operative position by reason of the stud 20 being held in the bearing 14 on the frame 4. This sleeve, in operation also serves in effect as a shaft-section or member, so that said bearing 14 will indirectly serve as a bearing at or support for the outer end of the shaft 17. The sleeve and shaft constitute separably or slidably connected elements for permitting rotating the scraper. Furthermore, this sleeve operates in effect as an extension on the shaft which is sustained in a bearing in alinement with the open bearing 3 so that both ends of the shaft will be removably supported in alinement with the trunnion-bearing 2. By providing means, which is movable on the shaft 17 to release it for removal, the necessity of first or independently removing or releasing the operating lever or the spring for operating the lever, is avoided.

The invention thus exemplifies an ice cream disher, from which the scraper and shaft may be readily and quickly removed. After the scraper and shaft have been removed, the lever may also be readily disconnected from the frame by lifting stud 11 out of the opening 9 because withdrawal of stud 19 from opening 14, and removal of the overlying shaft 17 will permit the lever to be separated from the handle.

The invention is not to be understood to be restricted to the details set forth, since these may be modified within the scope of the appended claims, without departing from the spirit and scope of the invention.

Having thus described my invention, what I claim as new, and desire to secure by Letters Patent, is:—

1. An ice-cream disher comprising a handle, a bowl on the handle, a scraper for the bowl, a scraper-shaft extending lengthwise of the handle, a lever pivoted to the handle, an actuator arm for rotating the shaft, operated by the lever, a spring for operating said lever in one direction, a bearing for the shaft, and means for holding the shaft in said bearing, said means being operable on the shaft independently of the lever to permit removal of the shaft from the bearing.

2. An ice-cream disher, comprising a handle, a bowl on the handle, a scraper for the bowl, a scraper-shaft extending lengthwise of the handle, a lever pivoted to the handle, an actuator element for rotating the shaft, operated by the lever, a trunnion on the scraper, a trunnion-bearing in the bowl, a bearing for the shaft, and means movably connected to the shaft for holding the shaft in its bearing, said means being operable on the shaft independently of the lever to permit removal of the shaft from the bearing.

3. An ice-cream disher comprising a handle, a bowl on the handle, a scraper for the bowl, a scraper-shaft extending lengthwise of the handle, a lever pivoted to the handle, an actuator element for rotating the shaft, operated by the lever, a plurality of bearings, one of which is open to permit the shaft to be moved laterally therefrom, and means for holding the shaft in operative position, said means being operable on the shaft independently of the lever to permit removal of the shaft from the handle.

4. An ice cream disher, comprising a handle, a bowl on the handle, a scraper for the bowl, a scraper-shaft extending lengthwise of the handle, a lever pivoted to the handle, an actuator element for rotating the shaft, operated by the lever, two bearings, one of which is open and the other of which is closed, and means for holding the shaft in operative relation to the handle, operable to release the shaft and permit it to be removed transversely through the open bearing.

5. An ice-cream disher comprising a handle, a bowl on the handle, a scraper for the bowl, a scraper-shaft extending lengthwise of the handle, a lever pivoted to the handle, an actuator element for rotating the shaft, operated by the lever, a trunnion on the scraper, a trunnion-bearing in the bowl, two bearings, one of which is open and the other closed, and means for holding the shaft in operative relation to the handle, operable to permit the shaft to be removed laterally through the open bearing.

6. An ice-cream disher, comprising a handle, a bowl on the handle, a scraper rotatable in the bowl, a scraper-shaft extending lengthwise of the handle, a lever pivoted on the handle, a spring applied to the lever and an actuator element having operative engagement with the lever, for rotating the shaft, and slidable on the shaft to permit the actuator element to be disengaged from the lever.

7. An ice-cream disher, comprising a handle, a bowl on the handle, a scraper rotatable in the bowl, a scraper-shaft extending lengthwise of the handle, a lever pivoted on the handle, a bearing for the shaft, on the handle, a trunnion on the scraper, a trunnion-bearing in the bowl, a spring applied to the lever, and an actuator element having operative engagement with the lever, for rotating the shaft, and slidable on the shaft to permit the actuator element to be disengaged from the lever.

8. An ice-cream disher, comprising a handle, a bowl on the handle, a scraper rotatable in the bowl, a scraper-shaft extending lengthwise of the handle, a lever pivoted on the handle, a spring applied to the lever, an actuator element slidable on the shaft and having operative engagement with the lever, for rotating the shaft, and a slidable connection between the shaft and the actuator element for permitting the actuator element to be disengaged from the lever, the actuator element, when engaging the lever, being limited in its rotation by the lever, the shaft being movable independently of the lever, when the actuator element is disengaged from the lever.

9. An ice-cream disher comprising a handle, a bowl on the handle, a scraper rotatable in the bowl, a scraper-shaft extending lengthwise of the handle, a lever pivoted on the handle, a spring applied to the lever, an actuator element slidable on the shaft and having operative engagement with the lever for rotating the shaft, a connection between the shaft and the actuator element, for permitting the actuator element to be disengaged from the lever, the actuator element and shaft when connected to the lever being limited in rotation by the lever, the shaft being movable independently of the lever when the actuator element is disengaged from the lever, and means for holding the actuator element in engagement with the lever.

10. In an ice-cream disher, the combination of a handle, a bowl on the handle, a scraper for the bowl, a scraper-shaft extending lengthwise of and rotatably mounted on the handle, a lever pivoted to the handle, a spring applied to the lever, a sleeve movable on the shaft having handle-engaging means for holding the shaft in operative relation to the handle, and movable out of engagement with the handle to permit removal of the shaft and scraper, and a lever-operated actuator element for rotating the shaft.

11. In an ice-cream disher, the combination of a handle, a bowl on the handle, a scraper for the bowl, a scraper-shaft extending lengthwise of and rotatably mounted on the handle, a lever pivoted to the handle, means for holding the shaft in operative relation to the handle, handle-engaging means movable out of engagement with the handle to permit removal of the shaft and scraper, and a lever-operated actuator element for rotating the shaft.

12. In an ice-cream disher, the combination of a handle, a bowl on the handle, a scraper for the bowl, a scraper-shaft extending lengthwise of the handle, a lever pivoted to the handle, a bearing, a sleeve slidable on the shaft, for holding the shaft in operative relation to the handle, and to permit removal of the shaft and scraper, and a lever-operated actuator element for rotating the shaft.

13. In an ice-cream disher, the combination of a handle, a bowl on the handle, a scraper for the bowl, a scraper-shaft extending lengthwise of and rotatably mounted on the handle, a lever pivoted to the handle, bearings, one of which is open and another of which is closed, a lever-operated actuator element for rotating the shaft, and a sleeve on the shaft, for holding the shaft in operative relation to the handle, and slidable on the shaft to permit the removal of the shaft and scraper.

14. In an ice-cream disher, the combination of a handle, a bowl on the handle, a scraper for the bowl, a scraper-shaft extending lengthwise of and rotatably mounted on the handle, a lever pivoted to the handle, a spring applied to the lever, a sleeve movable on the shaft, for holding the shaft in operative relation to the handle, means for yieldingly holding the sleeve in operative position, the sleeve being movable to release the shaft, and a lever-operated actuator element for rotating the shaft.

15. An ice-cream disher, comprising a bowl, a scraper rotatable in the bowl, a rigid handle on the bowl, a rigid lever having its end nearest the bowl pivoted to said handle, a scraper-shaft extending lengthwise of the handle and mounted thereon to move the scraper transversely across the bowl, said handle having a fixed bearing thereon, for the outer end of the shaft, an actuator element on the shaft, a spring applied to the lever to operate it in one direction, an operative connection between the outer end of the rigid lever and the actuator element, for rotating the shaft in either direction, and means for removably holding the shaft in said bearing.

16. An ice-cream disher comprising a handle, a bowl on the handle, a scraper mounted to sweep across the bowl, a trunnion on the scraper, a scraper-shaft extending lengthwise of the handle, a trunnion-bearing in the bowl, a bearing for the shaft, a lever pivoted to the handle, a spring for operating the lever in one direction, and a lever-operated actuator element on the shaft for rotating the shaft, said shaft and actuator element being removable independently of said spring.

17. An ice-cream disher, comprising a handle, a bowl on the handle, a scraper for the bowl, a scraper-shaft extending lengthwise of the handle, a lever pivoted to the handle, an actuator element on and for rotating the shaft, operated by the lever, said lever being removable from the handle, said shaft being disposed to overlie the lever to hold it in pivotal relation to the handle, and means for removably holding the shaft.

18. In an ice cream disher, the combination of a bowl, a support, a scraper coöperating with the bowl and including a rock shaft adjacent said support, a lever pivoted on said support to control the movements of the scraper, and means normally holding the rock shaft in proper spaced relation to the support and permitting ready removal thereof from the support, said shaft constituting the sole means to hold the lever from displacement from its support.

19. In an ice-cream disher, the combination of a bowl, a handle on the bowl, extending laterally therefrom, a scraper rotatable in the bowl, to sweep transversely across the bowl, means for operating the scraper, extending in the direction of the handle, and comprising separably connected elements, a bearing on the handle, an actuator member on one of said elements, and a lever for operating the actuator member, one of said elements being removable from the other, the actuator member being removable with one of the elements.

20. In an ice-cream disher, the combination of a bowl, a handle on the bowl and extending laterally therefrom, a scraper rotatable in the bowl, means for operating the scraper, extending in the direction of the handle and comprising separably connected elements, bearings for said means, both of said elements being removable from the handle, and means for rotating said operating means.

21. In an ice cream disher, the combination of a bowl, a handle on the bowl and extending laterally therefrom, a scraper rotatable in the bowl to sweep transversely across the bowl, means for operating the scraper extending in the direction of the handle and comprising detachably connected elements, a bearing in which one of the elements is removably held and means for rotating said element.

22. In an ice cream disher, the combination of a bowl, a handle secured to and extending laterally from the bowl, a scraper rotatable in the bowl, scraper-operating means extending longitudinally of the handle and comprising detachably connected elements, one of the elements being secured to the scraper, and means for rotating said elements, comprising a lever pivoted on the handle and an actuator member secured to the other element and operated by the lever.

23. In an ice cream disher, the combination of a bowl, a handle secured to the bowl and extending laterally therefrom, a scraper rotatable in the bowl to sweep transversely across the bowl, scraper operating means comprising detachably connected elements and extending longitudinally of the handle, said scraper being secured to one of said elements, bearings for said elements, and mechanism for rotating said scraper operating means comprising a lever and an actuator member operated by said lever and connected to the other element.

In testimony whereof I affix my signature in presence of two witnesses.

RAYMOND B. GILCHRIST.

Witnesses:
  AGNES GILCHRIST,
  DAVID H. MEAD.